(12) United States Patent
Stevens

(10) Patent No.: US 8,380,608 B2
(45) Date of Patent: Feb. 19, 2013

(54) SYSTEM AND METHOD FOR CREATING A SPOT MARKET

(75) Inventor: Robert G. Stevens, Tokyo (JP)

(73) Assignee: Ariba, Inc., Sunnyvale, CA (US)

( * ) Notice: Subject to any disclaimer, the term of this patent is extended or adjusted under 35 U.S.C. 154(b) by 1435 days.

(21) Appl. No.: 09/783,746

(22) Filed: Feb. 15, 2001

(65) Prior Publication Data

US 2002/0111894 A1 Aug. 15, 2002

(51) Int. Cl.
*G06Q 40/00* (2012.01)
(52) U.S. Cl. .......................................................... 705/37
(58) Field of Classification Search .................. 705/26, 705/36, 37
See application file for complete search history.

(56) References Cited

U.S. PATENT DOCUMENTS

| | | | |
|---|---|---|---|
| 3,581,072 A | 5/1971 | Nymeyer | |
| 3,863,060 A | 1/1975 | Rode et al. | |
| 4,597,045 A | 6/1986 | Kiuchi | |
| 4,674,044 A | 6/1987 | Kalmus et al. | |
| 4,789,928 A | 12/1988 | Fujisaki | |
| 4,799,156 A | 1/1989 | Shavit et al. | |
| 4,845,625 A | 7/1989 | Stannard | |
| 4,992,940 A | 2/1991 | Dworkin | |
| 5,136,501 A | 8/1992 | Silverman et al. | |
| 5,193,056 A | 3/1993 | Boes | |
| 5,243,515 A | 9/1993 | Lee | |
| 5,297,032 A | 3/1994 | Trojan et al. | |
| 5,375,055 A | 12/1994 | Togher et al. | |
| 5,394,324 A | 2/1995 | Clearwater | |
| 5,402,336 A | 3/1995 | Spiegelhoff et al. | |
| 5,606,602 A | 2/1997 | Johnson et al. | |
| 5,629,982 A | 5/1997 | Micali | |
| 5,640,569 A | 6/1997 | Miller et al. | |

(Continued)

FOREIGN PATENT DOCUMENTS

| | | |
|---|---|---|
| EP | 0399850 A | 11/1990 |
| JP | 409101994 A | 4/1997 |

(Continued)

OTHER PUBLICATIONS eBay Item 262794438. Feb. 16, 2000. pp. 1-2.*

(Continued)

*Primary Examiner* — Muriel Tinkler
(74) *Attorney, Agent, or Firm* — Van Pelt, Yi & James LLP

(57) ABSTRACT

A system and method for soliciting and receiving bids for goods or services necessary to satisfy a spot need of a buyer. The system receives a request to procure goods or services that are required to satisfy the spot need of the buyer. The request includes information identifying the type of goods or services being procured by the buyer. Next, the system automatically selects a plurality of suppliers to invite to the online auction by querying a supplier database with information from the request. The supplier database includes records identifying suppliers capable of supplying a plurality of different goods and services to a spot marketplace. For each supplier represented in the supplier database, a record is stored in the supplier database, which includes information representing the capabilities of the supplier to deliver at least one good or service. The system automatically invites the suppliers selected from the supplier database to offer bids by sending an electronic communication to each of the selected suppliers. Each of the suppliers is electronically coupled online to the spot marketplace. Finally, a winner bidder is selected to satisfy the spot need of the buyer.

17 Claims, 9 Drawing Sheets

U.S. PATENT DOCUMENTS

| | | |
|---|---|---|
| 5,664,115 A | 9/1997 | Fraser |
| 5,684,963 A | 11/1997 | Clement |
| 5,689,652 A | 11/1997 | Lupien et al. |
| 5,715,402 A | 2/1998 | Popolo |
| 5,727,165 A | 3/1998 | Ordish et al. |
| 5,758,327 A | 5/1998 | Gardner et al. |
| 5,758,328 A * | 5/1998 | Giovannoli .................. 705/26.4 |
| 5,765,138 A | 6/1998 | Aycock et al. |
| 5,774,873 A | 6/1998 | Berent et al. |
| 5,794,207 A * | 8/1998 | Walker et al. .................. 705/77 |
| 5,794,219 A | 8/1998 | Brown |
| 5,797,127 A | 8/1998 | Walker et al. |
| 5,799,151 A | 8/1998 | Hoffer |
| 5,799,285 A | 8/1998 | Klingman |
| 5,802,502 A | 9/1998 | Gell et al. |
| 5,803,500 A | 9/1998 | Mossberg |
| 5,809,483 A | 9/1998 | Broka et al. |
| 5,826,244 A | 10/1998 | Huberman |
| 5,832,496 A | 11/1998 | Anand et al. |
| 5,835,896 A | 11/1998 | Fisher et al. |
| 5,862,223 A | 1/1999 | Walker et al. |
| 5,890,138 A | 3/1999 | Godin et al. |
| 5,897,621 A | 4/1999 | Boesch et al. |
| 5,905,974 A | 5/1999 | Fraser et al. |
| 5,905,975 A | 5/1999 | Ausubel |
| 5,915,209 A | 6/1999 | Lawrence |
| 5,966,699 A | 10/1999 | Zandi |
| 6,014,627 A | 1/2000 | Togher et al. |
| 6,021,398 A * | 2/2000 | Ausubel .................. 705/37 |
| 6,023,685 A | 2/2000 | Brett et al. |
| 6,044,363 A | 3/2000 | Mori et al. |
| 6,055,518 A | 4/2000 | Franklin et al. |
| 6,058,379 A | 5/2000 | Odom et al. |
| 6,061,663 A | 5/2000 | Bloom et al. |
| 6,078,906 A | 6/2000 | Huberman |
| 6,119,229 A | 9/2000 | Martinez et al. |
| 6,151,589 A | 11/2000 | Aggarwal et al. |
| 6,161,099 A | 12/2000 | Harrington et al. |
| 6,199,050 B1 | 3/2001 | Alaia et al. |
| 6,266,652 B1 * | 7/2001 | Godin et al. .................. 705/37 |
| 6,366,891 B1 | 4/2002 | Feinberg |
| 6,415,264 B1 * | 7/2002 | Walker et al. .................. 705/26 |
| 6,785,660 B1 * | 8/2004 | Fedor et al. .................. 705/37 |
| 7,069,242 B1 * | 6/2006 | Sheth et al. .................. 705/37 |

FOREIGN PATENT DOCUMENTS

| | | |
|---|---|---|
| JP | 410078992 A | 3/1998 |
| WO | WO 92/15174 | 9/1992 |
| WO | WO 97/37315 | 10/1997 |
| WO | WO 98/34187 | 8/1998 |
| WO | WO 99/63461 | 12/1999 |

OTHER PUBLICATIONS

Andrews, "Auctions Catch the Interest of Hobbyists and Big Business", Aug. 24, 1998.

Associated Press, "Auction on Web is Buyer's Market", Apr. 6, 1998.

"BroadVision Developing First Interactive Commerce Management System to Support Online Sales & Marketing Process; New Software Category Necessary to Interactive Network Architecture", Business Wire, p.5150152, May 15, 1995.

Danny Cohen, "Computerized Commerce", Information Processing 89, Aug. 28-Sep. 1, 1989.

"FairMarket Launches New Self-Serve Auctions", Business Wire, p. 6161495, Jun. 16, 1998.

Jahnke, "How Bazaar", CIO Web Business Magazine, Aug. 27, 1998.

Jean-Pierre Banatre, et al., "The Design and Building of Enchere, a Distributed Electronic Marketing System" Communications of the ACM, No. 1, Jan. 29, 1986.

Lee, "Do electronic marketplaces lower the price of goods?", Communications of the PCM, v41n1 pp. 73-80, Jan. 1998.

Malone, et al., "The Logic of Electronic Markets", Harvard Business Review, No. 893II, May-Jun. 1989.

"Moai Technologies Introduces New categories of Business to Business Auction Software . . .", Business Editors and Computer Writers, Mar. 16, 1998.

Kikuchi, et al., "Multi-Round Anonymous Auction Protocols", IEICE Trans. Inf. & Syst., vol. E82-D, No. 4, Apr. 1999.

"Online bidding software", Electronic Buyers' News, Issue 1072, p. 86, 1/6p, Aug. 25, 1997.

Sairamesh, et al., "Economic Framework for Pricing and Charging Digital Libraries", D-Lip Magazine, Feb. 1996.

"Sold! . . . To the Lowest Bidder", Computer Finance, v6, n2, Jul. 1995.

"Venture Capitalists Fund Two Massachusetts Internet Related Companies", Boston Globe, Jan. 14, 1998.

Vigoroso, "Buyers prepare for brave new world of e-commerce", Purchasing, v126, n6, pS4(1), Apr. 22, 1999.

Von der Fehr, et al., "Predatory bidding in sequential auctions", Oxford Economics Papers, v46, n3, p. 345(12), Jul. 1994.

"What you need to know to bid in FCC's narrowband auction", Washington Telecom News, v2, n26, p. 6(2), Jun. 27, 1994.

Wilder, "What's Your Bid?—FreeMarkets' real-time online bidding technology lets clients drive downcosts and improve product value", InformationWeek, Nov. 10, 1997.

Woolley, "E-muscle", Forbes, Mar. 9, 1998.

* cited by examiner

TCP/IP LAYERING MODEL

FIG. 3

BIDDERS POST BIDS

TRANSPORTATION MARKETPLACE - MICROSOFT INTERNET EXPLORER

FILE   EDIT   VIEW   GO   FAVORITES   HELP

ADDRESS: HTTP://USPGDW01/TE/BIDDER.HTML  [LINKS »]

TRANSPORT MARKETPLACE

FEBRUARY 8, 2000 5:40 PM
(ALL TIMES ARE US EASTERN TIME)

BIDDER
- OPPORTUNITIES
- CLOSED LOADS
- VIEW MY BIDS
- CONFIRM AWARDED BID
- LOGOUT

LOAD DETAILS

| REGISTER NUMBER: | 111-2222 | SHIP TO ADDRESS: | 1 CUSTOMER LANE NORMALVILLE, PA-11111 |
|---|---|---|---|
| CUSTOMER NAME: | JOE CUSTOMER | CUSTOMER PHONE NO.: | 111-2222 |
| PICKUP INSTRUCTIONS: | TURN RIGHT AT THE LIGHT | EQUIPMENT REQUIRED: | 48' |
| NUMBER OF PALLETS: | 15 | NO OF CASES: | 22 |
| PICKUP LOCATION: | SHIREMANSTOWN | WEIGHT: | 500 LBS |
| REQUEST SUBMIT DATE/TIME: | 2/8/00 5:39 PM | PICKUP DATE: | 2/9/00 5:13 PM |
| REQUESTED ARRIVAL DATE: | 2/10/00 5:13 PM | RESPONSE DEADLINE: | 2/8/00 5:43 PM (EASTERN TIMEZONE) |

ENTER THE VALUES HERE IF YOU WANT TO PLACE A BID:

MY BID(FLAT RATE)   $ 500    CHECK HERE IF THIS IS CONTRACT PRICE ☐     [SUBMIT BID]

COMMENTS(IF ANY)   I CAN MAKE IT BY 10 AM
MY CURRENT BID

CLICK ON THIS BUTTON TO DECLINE FROM BIDDING FOR THIS LOAD:

[I DECLINE]        [GO BACK]

FREEMARKETS HOME
↙ REGISTRATION REQUIRED

LOCAL INTERNET ZONE

FIG. 5

SPONSOR REVIEWS BIDS AND MAKES AWARD

TRANSPORTATION MARKETPLACE - MICROSOFT INTERNET EXPLORER

FILE   EDIT   VIEW   GO   FAVORITES   HELP

ADDRESS: HTTP://USPGDV01/TE/SPONSOR_VIEWBIDS.HTML

TRANSPORT MARKETPLACE

FEBRUARY 8, 2000 5:41 PM
(ALL TIMES ARE US EASTERN TIME)

SPONSOR
- NEW LOAD
- VIEW BIDS FOR A LOAD
- REMOVE LOAD FROM MARKET
- BIDDER INFO
- VIEW CLOSED LOADS
- LOGOUT

VIEW BIDS FOR A LOAD
LOAD REQUIREMENTS WHICH ARE OPEN FOR BIDDING ARE LISTED HERE

REGISTER NUMBER: 111-2222   SHIP TO ADDRESS: NORMALVILLE, PA - 11111
CUSTOMER NAME: JOE CUSTOMER   WEIGHT: 500 LBS
PICKUP DATE: 2/9/00 5:13 PM   NO OF BIDS: 1
PICKUP LOCATION: SHIREMANSTOWN   EQUIPMENT REQUIRED: 48'
REQUESTED ARRIVAL DATE: 2/10/00 5:13 PM   RESPONSE DEADLINE: 2/8/00 5:43 PM (EASTERN TIMEZONE)

LOAD 1 OF 1

| COMPANY NAME | BID REGISTER DATE - TIME | BIDDER'S COMMENT | CONTRACT | BID VALUE | AWARD BID |
|---|---|---|---|---|---|
| H | 2/8/00 5:41 PM | VIEW | NO | $500 | AWARD BID |

FREEMARKETS HOME
— REGISTRATION REQUIRED

CALL 1-877-303-FMKT FOR HELP FROM 8:00 AM TO 5:00 PM (US EASTERN TIME) MONDAY - FRIDAY OR EMAIL QUESTIONS TO SUPPORT@FREEMARKETS.COM 24 HOURS A DAY

LOCAL INTERNET ZONE

FIG. 6

BIDDER CONFIRMS AWARD

TRANSPORTATION MARKETPLACE - MICROSOFT INTERNET EXPLORER

FILE  EDIT  VIEW  GO  FAVORITES  HELP

ADDRESS  HTTP://USPGDV01/TE/BIDDER.HTML  LINKS »

TRANSPORT MARKETPLACE

FEBRUARY 8, 2000 6:43 PM
(ALL TIMES ARE US EASTERN TIME)

BIDDER
- OPPORTUNITIES
- CLOSED LOADS
- VIEW MY BIDS
- CONFIRM AWARDED BID
- LOGOUT

FREEMARKETS HOME
↳ REGISTRATION REQUIRED

CONFIRM BID

FOLLOWING BIDS ARE PENDING FOR YOUR CONFIRMATION

TOTAL 1

| REGISTER NUMBER | BID REGISTER DATE-TIME | CONTRACT | BID VALUE | CONFIRMATION DEADLINE (+-1 MIN) | CONFIRM BID |
|---|---|---|---|---|---|
| 111-2222 | 2/8/00 5:41 PM | NO | $500 | 2/8/00 6:13 PM | I ACCEPT |

CALL 1-877-303-FMKT FOR HELP FROM 8:00 AM TO 5:00 PM (US EASTERN TIME) MONDAY - FRIDAY OR EMAIL QUESTIONS TO SUPPORT@FREEMARKETS.COM 24 HOURS A DAY

LOCAL INTERNET ZONE

FIG. 8

SYSTEM AND METHOD FOR CREATING A SPOT MARKET

FIELD OF THE INVENTION

The present invention relates to a system and method for conducting electronic auctions, and more particularly, to a system and method for creating a spot market over a computer network.

BACKGROUND OF THE INVENTION

Advances in computer processing power and network communications have made information from a wide variety of sources available to users on computer networks. Computer networking allows network computer users to share information, software applications and hardware devices and internetworking enables a set of physical networks to be connected into a single network such as the Internet. Today, computers connected to the Internet have almost instant access to information stored in relatively distant regions. Moreover, computers connected to networks other than the Internet also have access to information stored on those networks. The World Wide Web (Web), a hypermedia system used on the Internet, enables hypertext linking, whereby documents automatically reference or link other documents located on connected computer networks around the world. Thus, users connected to the Internet have almost instant access to information stored in relatively distant regions. Currently, Internet users retrieve information from the Internet, through the Web, by 'visiting' a web site on a computer that is connected to the Internet.

The web site is, in general terms, an application that displays information stored on a network computer. The web site accepts connections from programs, such as Internet browser applications. Browser applications, such as Microsoft Explorer™ or Netscape Internet Browser™, allow Internet users to access information displayed on the web site.

As the number of physical networks connected to the Internet continues to grow, so too will the number of web sites that are accessible to Internet users and so too will commercial activity on the Internet. Providers of a wide range of products and/or services are continuously exploring new methods for using the Internet to accomplish business goals. Some companies use the Internet to purchase products through on-line auctions.

However, products, such as transportation and Maintenance, Repair and Operations (MRO) components, that generally require quick turnaround times cannot be purchased through on-line auctions since there is insufficient time to alert suppliers about the auction and for the suppliers to place their bids.

Most large companies have employees or expeditors that make unplanned/"spot" buys on a regular basis as necessary for a company's business. These spot buys are specifically purchases that require relatively immediate delivery. For example a manager in a large company may receive a request for transportation for immediate delivery of products. Such requests may come at anytime of the day, although they usually occur in the afternoon. Traditionally, the manager fills the spot needs by having the expeditor contact suppliers that have existing contracts with the company, one at a time. As soon as a supplier agrees to fill the need, the employee stops calling other suppliers. Since there is a preexisting contract between the supplier and the company, the employee usually follows up with the price at a later time. This method may take a lot of the expeditor's time based on the amount of spot needs that must be fulfilled. In addition, the company usually takes the first price that is quoted without taking the time to locate and compare different quotes. Thus, the company loses both time and money in these transactions.

Currently, there are companies that provide business-to-business procurement solutions, mostly through on-line exchanges or through software packages that integrate with existing desktop applications. One company offers a suite of bidding applications that can be used as standalones or integrated with major electronic procurement packages. These business-to-business procurement solutions handle complex procurement needs with extended bidding times. What is needed is a product that handles spot purchases with quick turnaround times.

SUMMARY OF THE INVENTION

The present invention is directed to a system and method for soliciting and receiving bids for goods or services necessary to satisfy a spot need of a buyer. Initially, the system receives a request to procure goods or services that are required to satisfy the spot need of the buyer. The request includes information identifying the type of goods or services being procured by the buyer. Next, the system automatically selects a group of potential bidders in response to the good or service identified in the request by querying a database. The database includes a plurality of groups of potential bidders, wherein each of the groups of potential bidders is associated with purchasing requests directed to a particular good or service. The system then electronically notifies each of the potential bidders in the selected group of an opportunity to submit a bid to satisfy all or part of the buyer's purchase request. The system electronically accepts bids from each of the potential bidders in the selected group and selects a winning bidder in accordance with the received bids.

In accordance with one embodiment, the database also stores information about each supplier such as, for example, geographic areas where a given supplier may be capable of delivering given goods or services, as well as historical performance of the supplier in connection with one or more prior on-line auctions. The historical performance information may include, for example, the bidding pattern of a supplier during one or more prior auctions, as well as the historical ability of the supplier to deliver particular goods or services following previous auctions where the supplier was the winning bidder. In this embodiment, the spot request from the buyer may further include information identifying a geographic location associated with the goods or services being procured by the buyer. When such geographic information is included with the request, the system may automatically select the bidders to invite by querying the supplier database using both the type and geographic location information from the request.

Since the present invention is directed to meeting spot needs of buyers, the process of automatically selecting bidders for the auction, automatically inviting the bidders to the auction, conducting the on-line auction and selecting a winning bidder are preferably completed either on the same business day that the request for procurement is received, or within 24 hours of receipt of the request.

The electronic communication used for inviting bidders to the auction may be sent to each of the selected bidders by, for example, posting a message on an electronic message board or sending an electronic mail message to each of the selected bidders.

It is the object of the present invention to offer buyers a low cost, high productivity spot market system, in a network environment, for making unplanned "spot" purchases that require quick turnaround times.

The spot market system of the present invention is optionally implemented as a portal that is accessible through an on-line marketplace. This enables the provider of the on-line marketplace to offer multiple products for servicing various clients' needs from one location. It also enables clients of the on-line marketplace to conduct business for themselves without paying for full services of a market making team.

Additional features and advantages of the invention will be set forth in the description that follows, and in part will be apparent from the description, or may be learned by practice of the invention. The objectives and advantages of the invention will be realized and attained by the system particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 3 illustrates a web page that an expeditor uses to post load information on the spot market of the present invention;

FIG. 5 illustrates a web page in the spot marketplace where pre-selected suppliers place bids;

FIG. 6 illustrates a web page in the spot marketplace where an expeditor reviews bids placed by any of the pre-selected suppliers;

FIG. 8 illustrates a web page in the spot marketplace where the winning supplier confirms the award.

DESCRIPTION OF THE PREFERRED EMBODIMENTS

Reference will now be made in detail to the preferred embodiments of the present invention, examples of which are illustrated in the accompanying drawings. The present invention described below explains the functionality of the inventive system and method for using a computer network to address spot needs.

Figure 1:
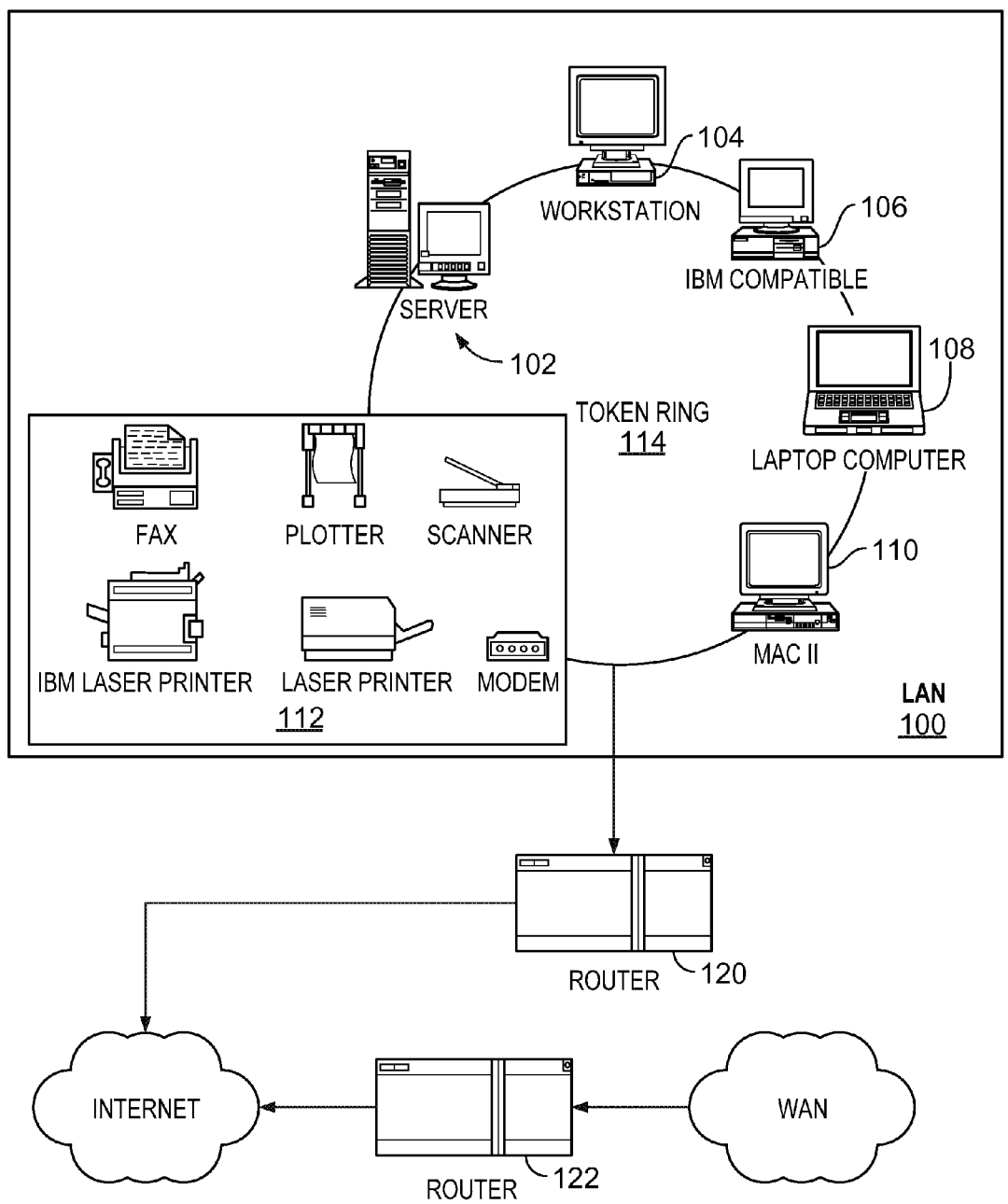
FIG. 1 illustrates a computer network in which the inventive system may be incorporated.

FIG. 1 is an example of a local area network (LAN) 100 that is configured to implement the inventive system. Note that while FIG. 1 is directed to a local area network, it should also be apparent that other network topologies, such as Ethernet, may be used. LAN 100 comprises a server 102, four computer systems 104-110, and peripherals, such as printers and other devices 112, which may be shared by components on LAN 100. Computer systems 104-110 may serve as clients for server 102 and/or as clients and/or servers for each other and/or for other components connected to LAN 100. As would be obvious to those skilled in the art, other network configurations, such a peer-to-peer configuration, may be used. Components on LAN 100 are preferably connected together by cable media, for example copper or fiber-optic cable and the network topology may be a token ring topology 114. It should be apparent to those of ordinary skill in the art that other media, for example, wireless media, such as optical and radio frequency, may also connect LAN 100 components.

Data may be transferred between components on LAN 100 in packets, i.e., blocks of data that are individually transmitted over LAN 100. Routers 120, 122 create an expanded network by connecting LAN 100 to other computer networks, such as the Internet, other LANs or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and the routers that connect them must adhere to a standard protocol. Computer networks connected to the Internet and to other networks typically use TCP/IP Layering Model Protocol. It should be noted that other internetworking protocols may be used.

Figure 2:
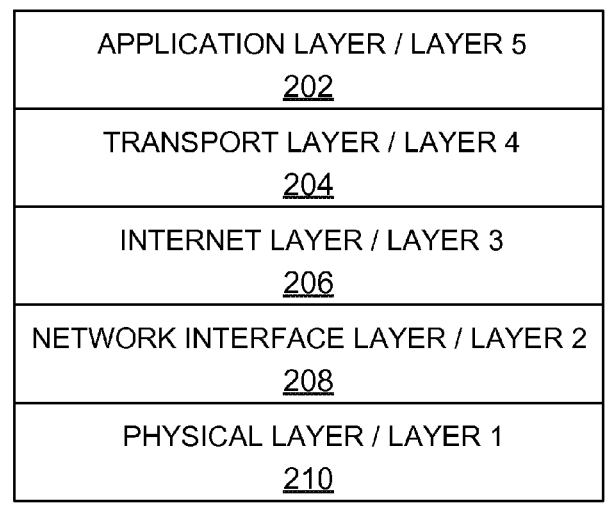
FIG. 2 illustrates the TCP/IP Layering Model Protocol used during communications between components on the computer network.

As illustrated in FIG. 2, TCP/IP Layering Model comprises an application layer (Layer 5) 202, a transport layer (Layer 4) 204, an Internet layer (Layer 3) 206, a network interface layer (Layer 2) 208, and a physical layer (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network. Physical layer protocols 210 correspond to the basic network hardware. By using TCP/IP Layering model protocols, any component connected to the network can communicate with any other component connected directly or indirectly to one of the attached networks.

Specifically, in the invention, a spot market system may reside either on server 102 or computers 104-110. The computer hosting the spot marketplace accesses a supplier database with information about a plurality of groups of potential bidders/suppliers, wherein each of the groups of potential bidders is associated with purchasing requests directed to a particular good or service.

Figure 3:
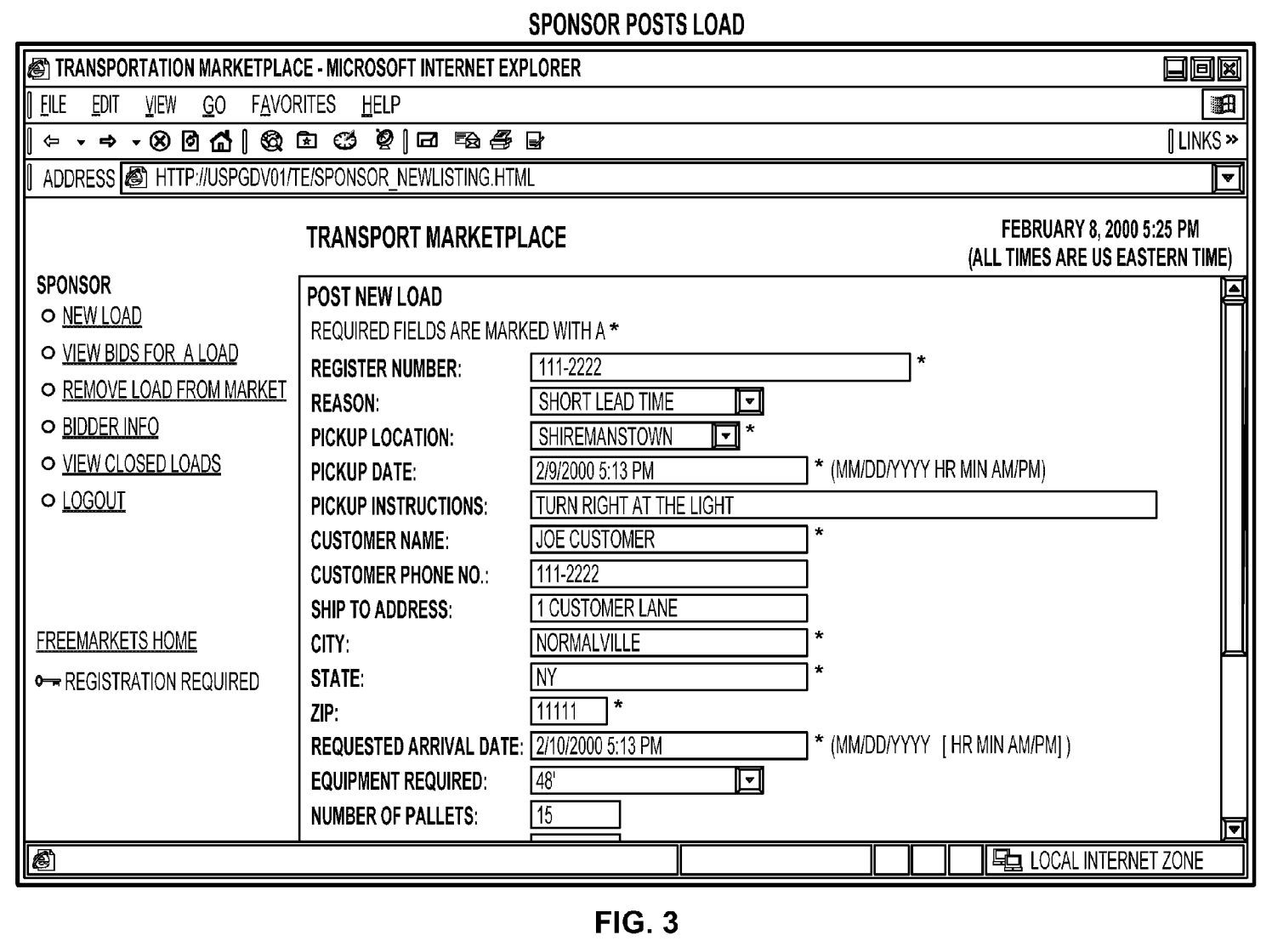

The spot market system is a web-based application that is implemented on a computer network, such as the Internet, thus creating a spot marketplace on the Internet. In a preferred embodiment, when there is a spot need that requires immediate response from multiple suppliers, the expeditor posts information about the spot need on the spot marketplace. For example, if there is a transportation request that requires a carrier to immediately deliver products in a transportation load, the expeditor posts information about the transportation load on the spot marketplace. Suppliers using computers connected to the computer network may access the information on the spot marketplace. FIG. 3 illustrates a web page that the expeditor uses to post the load information on the spot market.

The spot market system automatically selects a plurality of suppliers that are capable of fulfilling the transportation request by querying the supplier database with information from the transportation request. The supplier database includes records identifying suppliers capable of supplying a plurality of different goods and services to the spot marketplace. For each supplier represented in the supplier database, a record is stored in the supplier database, which includes information representing the capabilities of the supplier to deliver at least one good or service. The system then automatically invites the suppliers selected from the supplier database to bid on the spot need by sending an electronic notification to each of the selected suppliers.

In accordance with a preferred embodiment, the supplier database also stores information about each supplier such as, for example, geographic areas where a given supplier may be capable of delivering given goods or services, as well as historical performance of the supplier in connection with one or more prior on-line solicitations for bids. The historical performance information may include, for example, the bidding pattern of a supplier during one or more prior solicitations, as well as the historical ability of the supplier to deliver particular goods or services following previous requests where the supplier was the winning bidder. In this embodiment, the spot request from the expeditor may further include information identifying a geographic location associated with the goods or services being procured. When such geographic information is included with the request, the system may automatically select the suppliers by querying the supplier database using both the type and geographic location information from the request.

Since the present invention is directed to meeting spot needs of buyers, the process of automatically selecting suppliers for solicitation, automatically inviting the suppliers to bid and selecting a winning bidder are preferably completed either on the same business day that the request for procurement is received, or within predetermined hours of receipt of the request.

Figure 4:
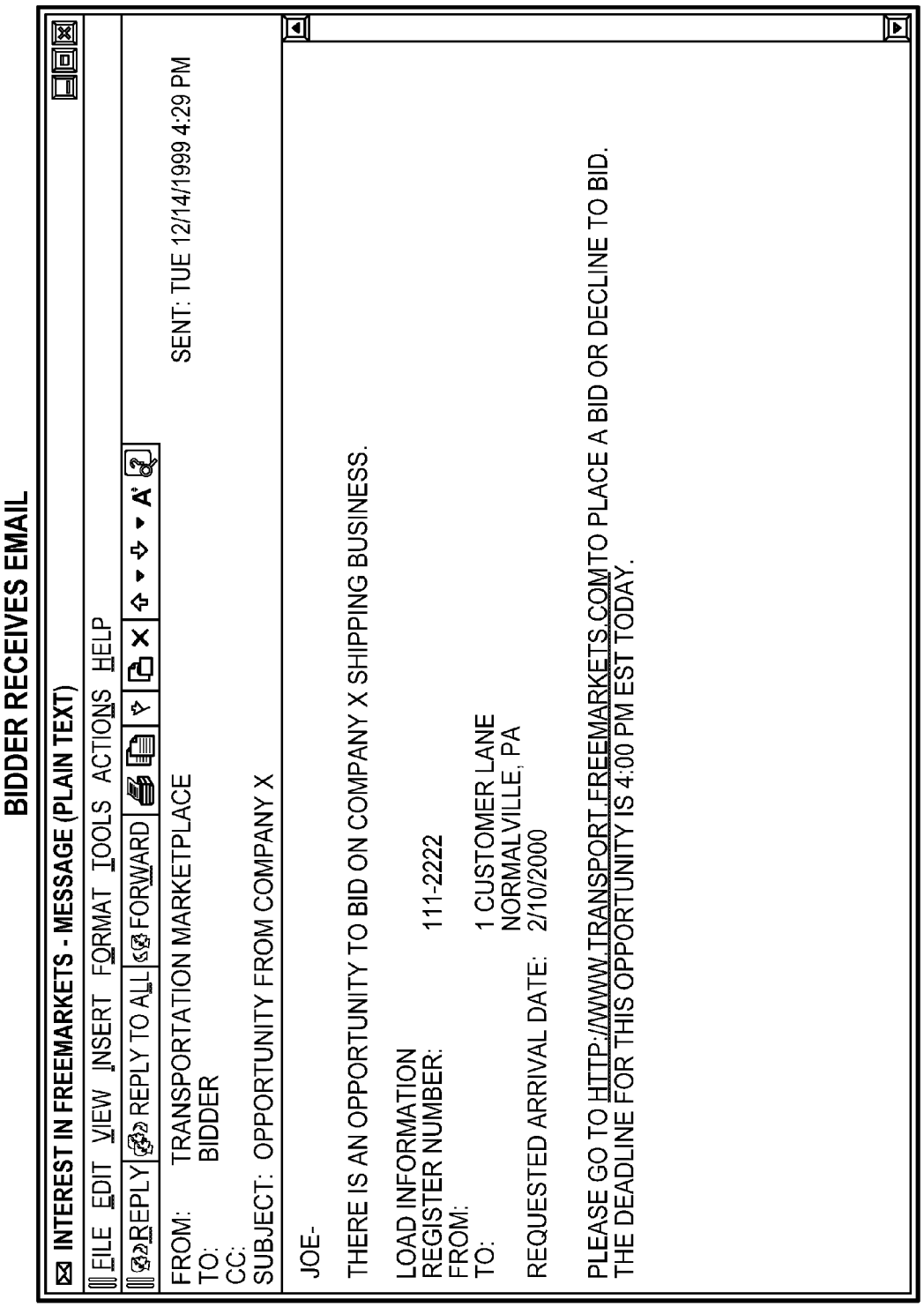
FIG. 4 illustrates an e-mail message from the expeditor to a supplier inviting the supplier to participate in a spot auction.

Only suppliers that are automatically selected by the system are allowed to bid in the spot need. Preferable, the electronic notification is an e-mail message from the expeditor to the pre-selected suppliers. However, other notification means, such as personal digital assistants and pagers, may be used. The notification includes a time for the suppliers to post a bid and a deadline when all bids must be posted. FIG. 4 illustrates an e-mail message from the expeditor to the suppliers inviting the suppliers to participate in the spot marketplace.

Figure 7:
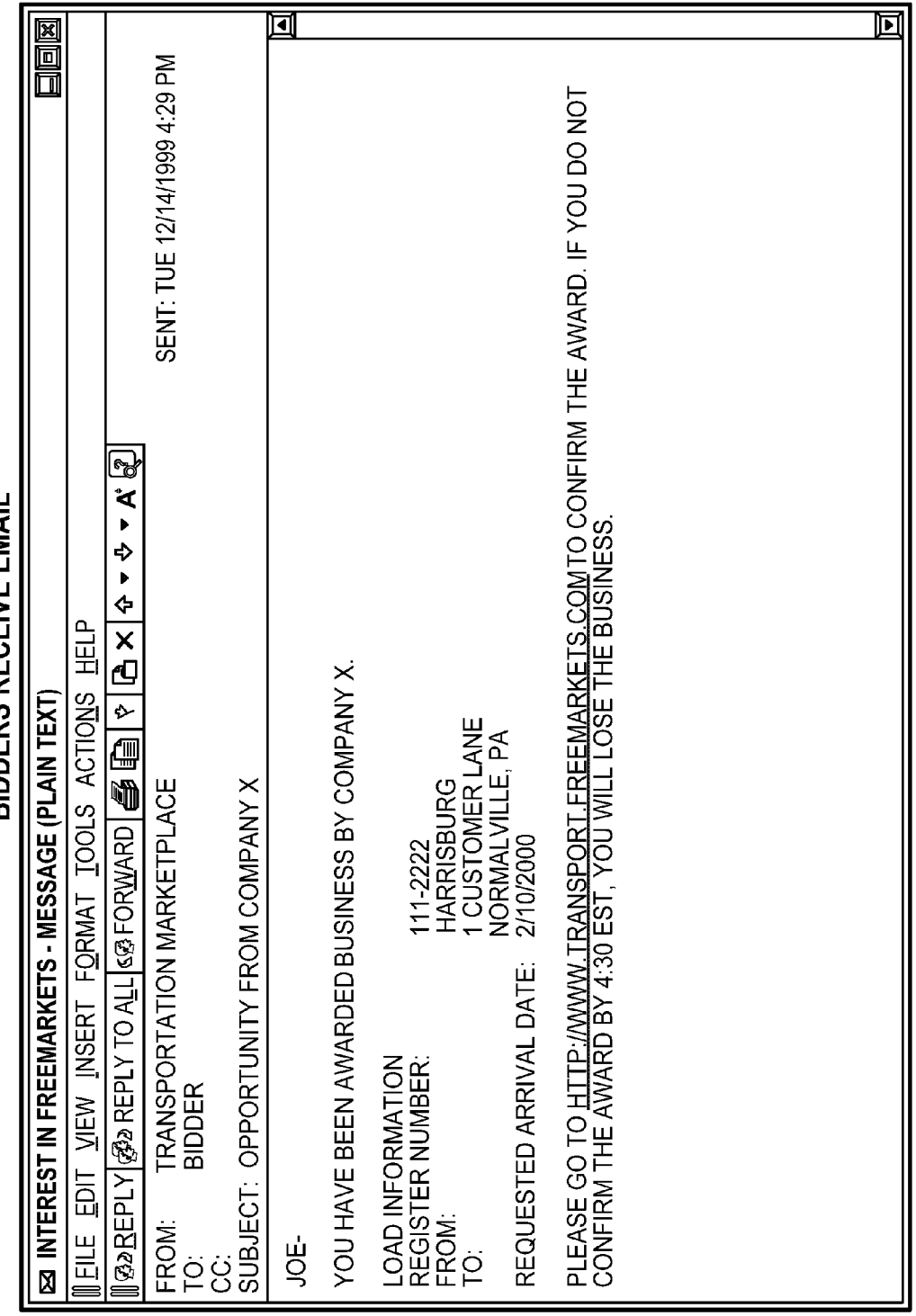
FIG. 7 illustrates an e-mail message from the expeditor to the winning supplier.

Thereafter, at a predetermined time, the suppliers go to the spot marketplace and post sealed bids before the deadline. In a preferred embodiment, suppliers who wish to bid must do so before the stated deadline and no bids are accepted after the deadline. When each supplier posts a bid, the bid is sealed and other suppliers are not allowed to see any information about the bid. In an alternate embodiment, the suppliers may posts partially open bids. After posting a first bid, the supplier is allowed to revise the bid until the deadline. It should be noted that suppliers will not be allowed to revise their bids after the deadline. All bids are valid for the day of the request until a winning supplier is awarded the bid and notified of the award. After the winning bid is awarded, all other suppliers are also notified about their status. FIG. 5 illustrates a web page in the spot marketplace where the pre-selected suppliers place bids or decline to bid. After the deadline, the expeditor reviews all bids and makes an award. FIG. 6 illustrates a web page in the spot marketplace where the expeditor reviews the bids and makes an award to a winning supplier. The expeditor sends a second notification to all suppliers and informs the winning supplier of the award. FIG. 7 illustrates an e-mail message from the expeditor to the winning supplier. The winning supplier confirms the award by visiting a web page in spot marketplace. FIG. 8 illustrates a web page in the spot marketplace where the winning supplier confirms the award.

Since the spot market is a portal that is accessible through an on-line marketplace, the provider of the on-line marketplace to is able offer multiple products for servicing various clients' needs from one location. It also enables clients of the on-line marketplace to conduct business for themselves without paying for full services of a market making team.

Figure 9:
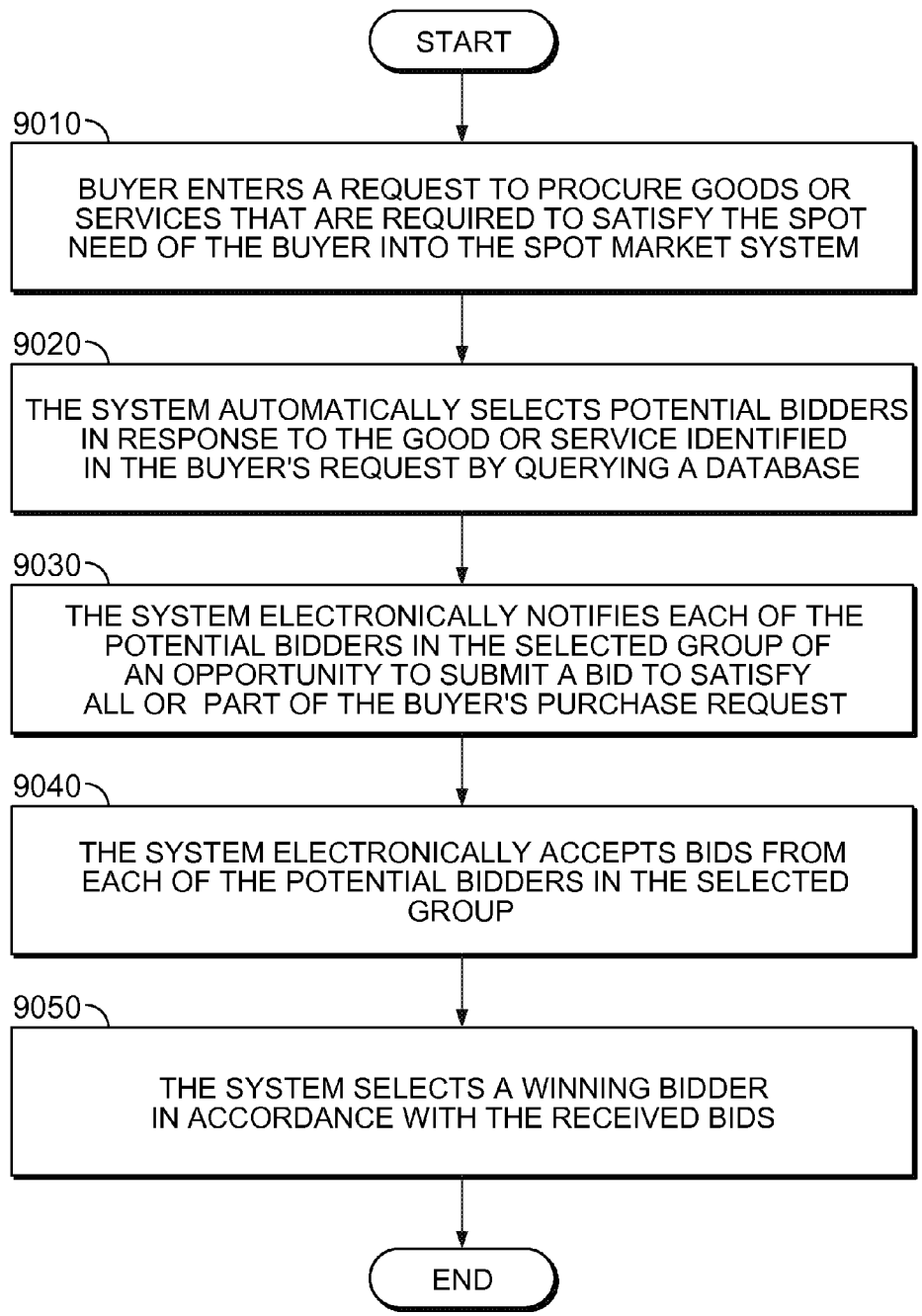
FIG. 9 illustrates a method for implementing the present invention.

FIG. 9 illustrates steps implemented in the inventive system. In Step 9010, the buyer enters a request to procure goods or services that are required to satisfy the spot need of the buyer into the spot market system. In Step 9020, the system automatically selects potential bidders in response to the good or service identified in the buyer's request by querying the supplier database. In Step 9030, the system electronically notifies each of the potential bidders in the selected group of an opportunity to submit a bid to satisfy all or part of the buyer's purchase request. In Step 9040, the system electronically accepts bids from each of the potential bidders in the selected group. In Step 9050, the system selects a winning bidder in accordance with the received bids.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method, comprising:

receiving a request to procure goods or services that are required to satisfy a spot need of a buyer, wherein at least one aspect of the spot need of the buyer is a requirement that the requested goods or services be available for immediate delivery, wherein the request includes information identifying a type of good or service being procured by the buyer, and wherein the request includes geographic information;

querying, using a processor, a database of information representing the capabilities of suppliers to deliver goods and services to geographic areas and automatically selecting as potential bidders for an auction those suppliers whose capabilities satisfy at least a portion of the request;

electronically notifying each of the potential bidders of an opportunity to submit a bid to satisfy all or part of the buyer's purchase request;

conducting the auction that includes electronically accepting bids from those potential bidders that each provide one or more bids before a bidding deadline expires and not accepting the bids after the bidding deadline expires; and automatically selecting one or more winning bidders in accordance with the received bids.

2. The method of claim 1, wherein automatically selecting, electronically notifying, electronically accepting and selecting a winning bidder are completed within the same business day of receipt of the request.

3. The method of claim 1, wherein automatically selecting, electronically notifying, electronically accepting and selecting one or more winning bidders are completed within 24 hours of receipt of the request.

4. The method of claim 1, wherein automatically selecting, electronically notifying, electronically accepting and selecting one or more winning bidders are completed within a predefined amount of hours of receipt of the request.

5. The method of claim 1, wherein the electronically notifying further comprises posting a message on an electronic message board.

6. The method of claim 1, wherein the electronically notifying further comprises sending an electronic mail message to each of the selected bidders.

7. The method of claim 1, wherein one or more steps in the method are performed by the buyer.

8. The method of claim 1, further comprising posting information about the request on a web page in a spot marketplace.

9. The method of claim 1, further comprising including a bidding time period and the bidding deadline in an electronic communication.

10. The method of claim 1, wherein the electronically notifying further comprises instructing the selected bidders to post bids before the bidding deadline.

11. The method of claim 1, wherein the electronically notifying further comprises instructing the selected bidders to post sealed bids before the bidding deadline.

12. The method of claim 1, wherein the electronically notifying comprises instructing the selected bidders to post partially open bids before the bidding deadline, wherein after a first bid each supplier may revise subsequent bids until the bidding deadline passes.

13. The method of claim 1, wherein the selecting further comprises notifying all bidders who posted bids about their status.

14. The method of claim 1, wherein selecting one or more winning bidders further comprises notifying the one or more winning bidders of an award by electronic communications.

15. A system, comprising:
a supplier database comprising information representing the capabilities of potential suppliers to deliver goods and services to geographic areas; and
a computer in communication with the supplier database and configured to:
receive a request to procure goods or services that are required to satisfy a spot need of a buyer, wherein at least one aspect of the spot need of the buyer is a requirement that the requested goods or services be available for immediate delivery, wherein the request includes information identifying a type of goods or services being procured by the buyer, and wherein the request includes geographic information;
query the database and automatically select as potential bidders for an auction the suppliers whose capabilities satisfy at least a portion of the request;
electronically notify each of the potential bidders of an opportunity to submit a bid to satisfy all or part of the buyer's purchase request;
conduct the auction, wherein conducting the auction includes electronically accepting bids from those potential bidders that each provide one or more bids before a bidding deadline expires and not accepting the bids after the bidding deadline expires; and
automatically select one or more winning bidders in accordance with the received bids.

16. The system of claim 15, wherein each of the bidders is electronically coupled to a spot marketplace.

17. A non-transitory computer readable medium comprising instructions which, when executed, cause a computer to:
receive a request to procure goods or services that are required to satisfy a spot need of a buyer, wherein at least one aspect of the spot need of the buyer is a requirement that the requested goods or services be available for immediate delivery, wherein the request includes information identifying a type of good or service being procured by the buyer, and wherein the request includes geographic information;
query a database of information representing the capabilities of suppliers to deliver goods and services to geographic areas and automatically select as potential bidders for an auction those suppliers whose capabilities satisfy at least a portion of the request;
electronically notify each of the potential bidders of an opportunity to submit a bid to satisfy all or part of the buyer's purchase request;
conduct the auction that includes electronically accepting bids from those potential bidders that each provide one or more bids before a bidding deadline expires and not accepting the bids after the bidding deadline expires; and
automatically select one or more winning bidders in accordance with the received bids.

\* \* \* \* \*